United States Patent [19]
Thompson et al.

[11] Patent Number: 6,160,546
[45] Date of Patent: *Dec. 12, 2000

[54] PROGRAM GUIDE SYSTEMS AND METHODS

[75] Inventors: John Garret Thompson; David Michael Berezowski, both of Tulsa, Okla.

[73] Assignee: United Video Properties, Inc., Tulsa, Okla.

[ * ] Notice: This patent issued on a continued prosecution application filed under 37 CFR 1.53(d), and is subject to the twenty year patent term provisions of 35 U.S.C. 154(a)(2).

[21] Appl. No.: 09/071,516

[22] Filed: May 1, 1998

[51] Int. Cl.[7] ...................................................... H04N 7/10
[52] U.S. Cl. .............................. 345/327; 348/906; 348/7; 348/9
[58] Field of Search ............................. 348/906, 10, 563, 348/564, 565, 12, 13; 455/6.2, 6.3, 4.1, 4.2; 345/327, 328

[56] References Cited

U.S. PATENT DOCUMENTS

| | | | |
|---|---|---|---|
| 5,559,548 | 9/1996 | Davis et al. | 348/6 |
| 5,579,055 | 11/1996 | Hamilton et al. | 348/476 |
| 5,596,373 | 1/1997 | White et al. | 348/569 |
| 5,635,978 | 6/1997 | Alten et al. | 348/7 |
| 5,781,246 | 7/1998 | Alten et al. | 348/569 |

OTHER PUBLICATIONS

Declaration of Mr. John Garret Thompson.

*Primary Examiner*—Victor R. Kostak
*Attorney, Agent, or Firm*—Fish & Neave; G. Victor Treyz; Richard M. Feustel

[57] ABSTRACT

A television program guide system is provided which includes a plurality of television distribution facilities, each connected to a plurality of associated television units. Each television distribution facility receives a global video stream which includes a stream of promotional videos from a main facility, receives program listings and program listings group information for the program listings from the main facility, and provides a video signal over the given channel to television units. At each television unit, the promotional information is displayed in the promotional information region and the program listings are displayed in the program listings region in accordance with the program listings group information. The display format is controllable from a main facility.

19 Claims, 8 Drawing Sheets

FIG. 1
PROMOTIONAL INFORMATION

| 4:01:52 | 4:00 | 4:30 | 5:00 |
|---|---|---|---|
| 15 MAX | THERE GOES THE NEIGHBORHOOD (COMEDY) | | |
| 16 | MURDER BY DEATH (COMEDY) (PG) (CC) | | |
| 17 TJC | TULSA PUBLIC SCHOOL(CC) | | |

PRIOR ART

FIG. 3
PROMOTIONAL INFORMATION

| 4:01:52 | 4:00 | 4:30 | 5:00 |
|---|---|---|---|
| 15 MAX | THERE GOES THE NEIGHBORHOOD (COMEDY) | | |
| 16 | MURDER BY DEATH (COMEDY) (PG) (CC) | | |
| 17 TJC | CHEAPER BY THE DOZEN (COMEDY) (PG) | | |

| | | | |
|---|---|---|---|
| PROMOTIONAL INFORMATION | | | |
| 4:01:52 | 4:00 | 4:30 | 5:00 |
| 21 | TERMINATOR (ACTION) | | |
| 43 | STAR WARS (ACTION) (PG) | | |
| 56 | JURASSIC PARK (ACTION) | | |

FIG. 5

| | | | |
|---|---|---|---|
| PROMOTIONAL INFORMATION | | | |
| 4:01:52 | 4:00 | 4:30 | 5:00 |
| 28 | SOUND OF MUSIC (MUSICAL) (PG) | | |
| 30 | MISS SAIGON (MUSICAL) | | |
| 57 | BEAUTY AND THE BEAST (MUSICAL) (PG) | | |

FIG. 6

| | | | |
|---|---|---|---|
| PROMOTIONAL INFORMATION | | | |
| 4:01:52 | 4:00 | 4:30 | 5:00 |
| 15 MAX | THERE GOES THE NEIGHBORHOOD (COMEDY) | | |
| 16 | MURDER BY DEATH (COMEDY) (PG) (CC) | | |
| 17 TJC | CHEAPER BY THE DOZEN (COMEDY) (PG) | | |
| 29 | THE BEVERLY HILLBILLIES (COMEDY) | | |

FIG. 7

| | | | |
|---|---|---|---|
| PROMOTIONAL INFORMATION | | | |
| 4:01:52 | 4:00 | 4:30 | 5:00 |
| 15 MAX | THERE GOES THE NEIGHBORHOOD (COMEDY) | | |
| 16 | MURDER BY DEATH (COMEDY) (PG) (CC) | | |

PROGRAM GUIDE SYSTEMS AND METHODS

BACKGROUND OF THE INVENTION

This invention relates to program guide systems, and more particularly, to television program guide systems which display program listings information on a single channel.

A large number of television channels are available over cable and satellite television systems. Television viewers have traditionally consulted preprinted program listings to determine which programs were scheduled to be broadcast on a particular day. More recently, television-based program guides have been developed that allow television viewers to view program listings directly on their television sets.

For example, the Prevue® channel is a scrolling television program guide (i.e., a browsing system) that a cable system operator may make available to subscribers over a dedicated television channel. Viewers can tune to the appropriate television channel to view program listings for television programs that are currently being broadcast and that are scheduled to be broadcast in the next few hours.

The lower half of the Prevue® channel display is occupied by a continuously scrolling series of program listings. The upper half of the Prevue® channel display screen is used to display quarter-screen promotional videos with accompanying text. Nationally distributed advertisements are displayed in the upper half of the display in place of the quarter-screen promotional videos according to a prearranged schedule. In addition, cable system operators may insert local video advertisements and graphics in the upper half of the display.

Cable and satellite television systems now in use can provide upwards of one-hundred channels. In the near future, systems with several hundred channels will no doubt appear, especially considering the increasing use of digital compression and transmission. Designers of program guides for use with such systems therefore face increasing challenges to present this massive amount of program listing information in a meaningful and easy-to-use manner. Continuously scrolling or paging program listings for large numbers of channels presents the viewer with a seemingly endless list, most of which may be of little or no interest. One solution has been to provide multiple dedicated television channels, each with a scrolling or paging television program guide corresponding to a subset of the total number of channels. Such systems may be less than optimal for several reasons, including the fact that multiple television channels must be dedicated to providing program guide information (consuming valuable bandwidth and resulting in a corresponding reduction in the number of television channels available for broadcasting television programs).

Heretofore, long lists of source identifiers (each uniquely corresponding to a particular television distribution facility) are broadcast. Because any particular television distribution facility may have its own program line up, it must have a unique source identifier. Program listings information corresponding to the program line up of each television distribution facility are transmitted along with each source identifier. In turn, each television distribution facility provides to its associated television units a video signal which includes the program listings information associated with that particular television distribution facility's program line up. A shortcoming associated with such systems is that they provide no solution to the problem of presenting viewers with a seemingly endless list of program listings for large numbers of channels.

Another potential shortcoming of browsing systems presently in use is that they lack easily controllable formatting (i.e., look and feel).

It is therefore an object of the present invention to provide a television program guide system which uses a single channel to display the program listings information.

It is a further object of the present invention to provide a television program system program listings information corresponding to a plurality of distinct groups of channels.

It is a further object of the present invention to provide a television program system with easily controllable formatting.

SUMMARY OF THE INVENTION

These and other objects of the invention are accomplished in accordance with the principles of the present invention by providing a television program guide system which includes a plurality of television distribution facilities, each connected to a plurality of associated television units.

A main facility (e.g., a satellite uplink) provides promotional videos and nationally distributed advertisements to television distribution facilities (e.g., cable headends) in the form of a global video stream. The main facility also provides a global video control stream containing commands that are synchronized to the content of the video stream. Data such as program listings and data used to control the configuration of the program guide display may also be provided by the main facility.

Each television distribution facility receives the global video stream which may include a stream of promotional videos, program listings display specifications, program listings, and program listings group information. In turn, each television distribution facility provides a video signal over the given channel to television units. At each television unit, the promotional information is displayed on the display screen and the program listings are displayed on the display screen based on the program listings group information. The graphic attributes of the display screen are determined by the display specification.

Each television distribution facility has a local promotion unit, which is a microprocessor-based system with character generator and video overlay capabilities. The local promotion units receive the program listings and generate corresponding program listings. The local promotion units provide a video signal containing the program listings and containing promotional information such as promotional videos, video advertisements, graphics, and text. The television distribution facilities distribute this video signal to viewers on a dedicated television channel. Viewers may use conventional television equipment to tune to the appropriate channel.

Each viewer's display is divided into a promotional information region and a program listings region. The program listings region is typically provided on the lower portion of the display in the form of a continuously scrolling program list. If desired, program listings may be provided in the form of successive pages of program listings.

The promotional information region is typically provided on the upper portion of the display. The promotional information region can be used to display quarter screen promotional videos and accompanying text.

The relative sizes of the promotional information region and program listings region can also be adjusted to reduce the size of the promotional information region when a logo or similar small graphic is displayed in the promotional information region. Reducing the size of the promotional information region to less than a half screen allows more program listings to be displayed for the viewer in the program listings region.

Further features of the invention, its nature and various advantages will be more apparent from the accompanying drawings and the following detailed description of the preferred embodiments.

DETAILED DESCRIPTION OF THE PREFERRED EMBODIMENTS

Figure 1:
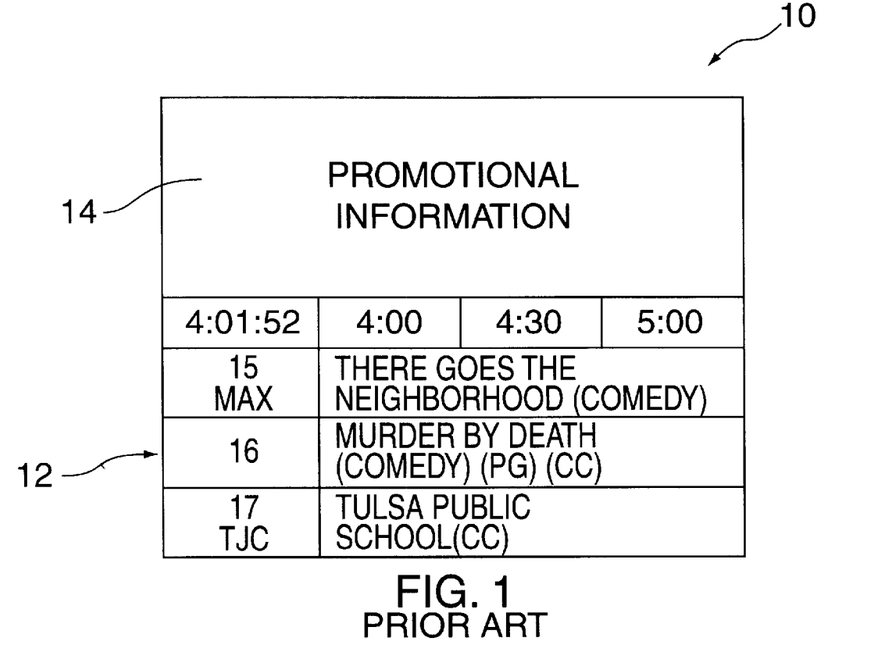
FIG. 1 is a view of a prior art television program guide display screen showing how the upper half of the screen is used to display promotional information and the lower half of the screen is used to display scrolling program listings.

The display screen (or "data view") 10 of a prior art program guide channel is shown in FIG. 1. Program listings 12 are provided on the lower half of display screen 10. Promotional information 14, such as promotional and advertising videos, text, and graphics, are displayed on the upper half of display screen 10. The upper and lower halves of the screen need not have fixed sizes.

Display screen 10 is made available to viewers in a cable operator's system on a dedicated television channel (i.e., the Prevue® channel). When a viewer is interested in reviewing current program listings or viewing promotional information, the viewer can tune to that channel.

Program listings 12 are provided by a character generator unit located in the headend facility of the cable system operator. The character generator unit periodically receives data for the program listings from a central uplink facility via satellite. Program listings 12 are provided in the form of a continuously scrolling grid. Program listings 12 primarily contain program guide information for upcoming television programs, but may also include program summaries, weather information, logos, or messages.

While the lower half of screen 10 is being used to display program listings 12, the upper half of screen 10 can be used for various purposes, such as for nationally distributed promotional videos or advertisements, local advertisements, graphics, etc.

Nationally distributed promotional videos are typically provided on the upper half of screen 10 by simultaneously supplying two video feeds to the character generator unit. One of the two videos is displayed on the upper half of screen 10 based on previously downloaded preferences. For example, the video from the first feed may be displayed in the upper left corner of display screen 10 (i.e., on the left side of the area reserved for promotional information 14) while corresponding text is displayed in the upper right corner. Alternatively, the video from the second feed may be displayed in the upper right corner while text is displayed in the upper left corner.

Nationally distributed advertising videos are shown periodically in the upper half of display screen 10. In addition, the cable system operator is given various opportunities to overlay local advertising videos in the upper half of screen 10. Because the upper half of display screen 10 is not large enough to accommodate a normal aspect ratio video that is larger than a quarter screen, a video that is displayed as part of promotional information 14 is typically matted in the horizontal dimension with color mats. The video is compressed in the vertical dimension.

In general, the upper portion of the display is a promotional information region and the lower portion of the display is a program listings region. When it is desired to promote a video, the display is divided into two equal halves. The lower half is used for program guide listings and the upper half is used for quarter screen videos with accompanying text. When it is desired to display an advertising video, the upper half of the display can be expanded to accommodate a normal aspect ratio video that is larger than a quarter screen and the lower half of the display can be contracted by a corresponding amount. In other situations, the promotional information region can be contracted (e.g., when accommodating a small logo) and the program guide listings region expanded by a corresponding amount. The relative sizes of the promotional information and program listings portions can be controlled by commands that are distributed globally (e.g., nationally or regionally) or by commands that are provided locally (e.g., at a cable system operator's headend facility).

In accordance with the present invention, a television program guide system is provided that includes a plurality of television distribution facilities, each connected to a plurality of associated television units. Each television distribution facility receives from a main facility a global video stream which includes a stream of promotional videos, program listings display specifications, program listings, and program listings group information. In turn, each television distribution facility provides a video signal over a selected channel to television units. At each television unit, the promotional information is displayed in the promotional information region and the program listings are displayed in the program listings region in accordance with the program listings group information and the display specification.

Figure 2:
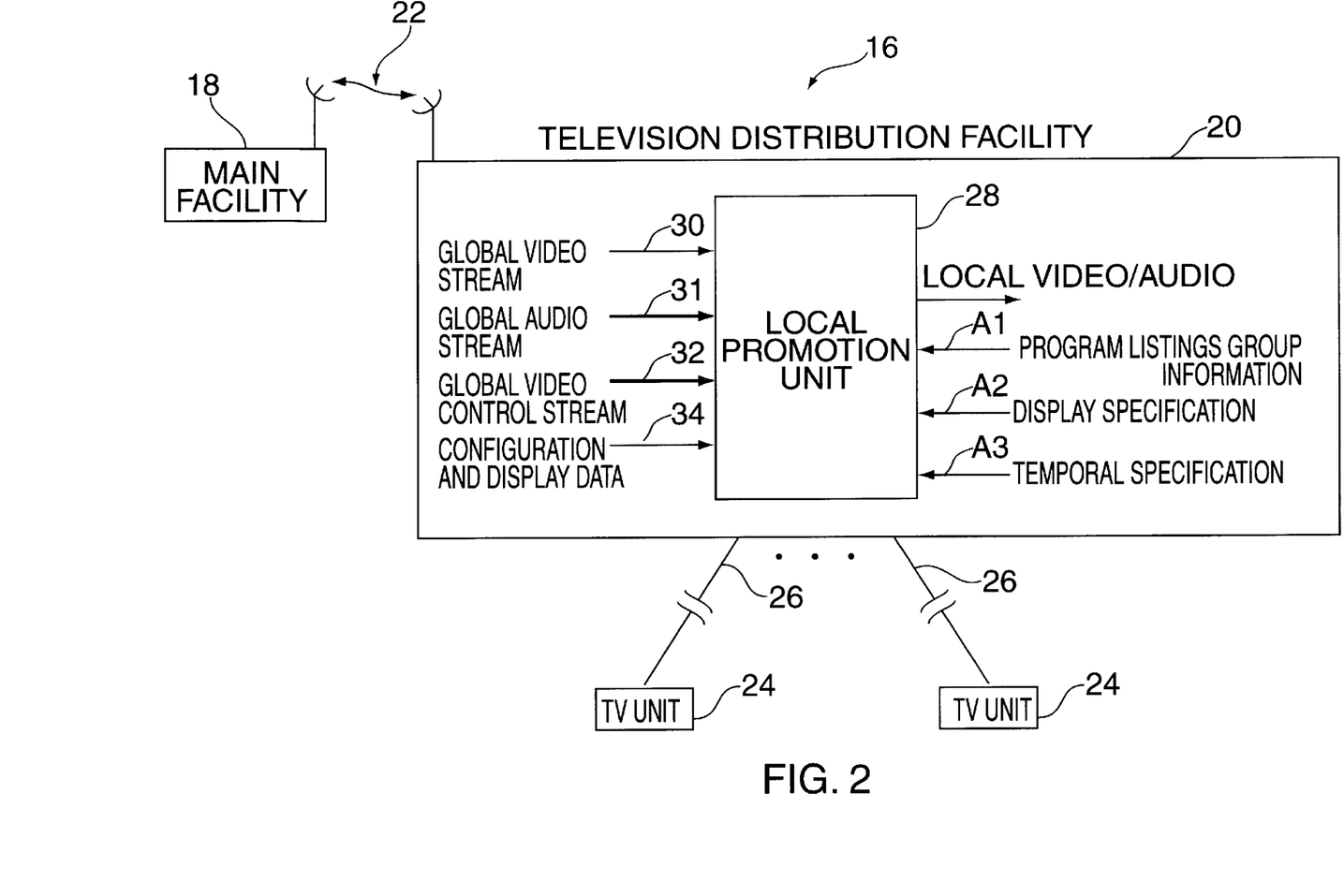
FIG. 2 is a diagram of an illustrative program guide system in accordance with the present invention.

As shown in FIG. 2, system 16 has main facility 18, which is preferably a central video and data satellite uplink facility. Main facility 18 is interconnected with multiple television distribution facilities such as television distribution facility 20 via satellite link 22. Television distribution facility 20, which is preferably a cable system headend, distributes conventional television channels and a program guide channel to television units 24 over television distribution links 26. Television units 24 are preferably conventional television sets, but could be any suitable equipment with the ability to receive a desired television channel. Television distribution links 26 may be coaxial cable links, fiber optic links, microwave links, satellite links, or a combination of any such suitable television distribution links.

Television distribution facility 20 includes local promotion unit 28, which is preferably a microprocessor-based computer system with data input ports, video overlay and character generating capabilities, local memory, and disk data storage. For example, local promotion unit 28 may be based on a computer such as the Amiga 2000 computer with a video genlock (generator synch lock) card. Local promotion unit 28 accepts video, control, and data streams from main facility 18 and accepts locally supplied video and graphics information (e.g., for local logos, graphics, advertising videos, etc.). If desired, local promotion unit 28 may accept local input from an input interface such as a keyboard connected to unit 28 or from a locally stored control file. If local keyboard input is accepted, local promotion unit 28 preferably uses globally controlled passwords or other suitable techniques to allow the program guide service provider at the main facility 18 to maintain centralized control over the use of the program guide service.

Main facility 18 preferably provides a continuous stream of video signals for the upper left and upper right quarters of a standard display screen. This video stream may be distributed globally (i.e., on a national basis or other suitable large-scale area). When it is desired to provide a nationally distributed video advertisement, the promotional videos in the video stream are replaced by the video for the advertisement. The global video stream from main facility 18 is received by local promotion unit 28 at input 30. A corresponding multichannel audio stream may be distributed likewise and may be received by local promotion unit 28 at input 31.

Main facility 18 also provides a video control stream that is received at input 32 of local promotion unit 28. The video control stream contains commands synchronized to the content in the global video stream. The video control stream is distributed globally, but may use regional addressing, if desired. Size change commands are provided in the global video control stream when the relative sizes of the promotional information and program listings regions are to be changed. Video control commands are also used to coordinate a variety of local promotion unit functions. For example, the insertion of a local video advertisement is synchronized by providing a local insert trigger command in the global video control stream. When a local promotion unit 28 receives the local insert trigger signal, local video insertion may begin. Other video control commands may relate to display options (e.g., how the local promotion unit 28 is to determine which video (left or right) is to be displayed during national video promotion periods). Prior to displaying a national advertising video, a control command may be sent to local promotion unit 28 to instruct local promotion unit 28 to clear the upper portion of the display screen.

Local promotion unit 28 receives a general purpose data stream containing configuration and display data at input 34. In contrast to the video control stream, which is preferably provided in real time in synchronization with the video stream, the configuration and display data is typically provided to local promotion unit 28 periodically (e.g., once per day). The data provided at input 34 preferably includes the television schedule data needed to generate program listings. The data provided at input 34 is also used by local promotion unit 28 to determine, e.g., the normal relative sizes of the promotional information and program listings regions, the speed of the program listing scroll (if the program listings are of the scrolled type), the duration of the brief hold period typically used during scrolling, the frequency with which summaries and weather and other such information are displayed, and the look-ahead time for compiling summary information for upcoming programs (e.g., a 2 hour look-ahead or a 48 hour look-ahead, etc.). Data may also be provided for displaying weather and messages interspersed with the program listings.

Local promotion unit 28 receives program listings group information at input A1 which is provided to serve as a template for determining the grouping of channels (according to various classifications, e.g., genre, rating, language, etc.) displayed in program listings region 40. Often it will be desirable to provide local promotion unit 28 with program listings group information corresponding to each of several channel groups (e.g. program listings group information for action movies, program listings group information for adult movies, program listings group information for children's movies, etc.).

Typically, program listings include television program listings. However, program listings may also include listings for local events (e.g., concerts, plays, sports events, etc.). Thus, program listings group information may include combinations of television and non-television program listings. For example program listings group information for sports might include television program listings related to sports television programs as well as program listings for upcoming professional sports events.

Local promotion unit 28 receives display specification at input A2 which is provided to determine the graphic attributes (e.g. color, size and shape of logos, etc.) of display screen 10. Often it will be desirable to provide local promotion unit 28 with multiple display specifications for use at different times of the day, at different seasons of the year, or in combination with selected program listings group information (e.g., a display specification designed for use at Christmas time and/or for use with program listings group information for holiday movies might have a red border decorated with candy-cane graphics).

Temporal specification is also provided to local promotion unit 28 at input A3 for controlling (i.e., synchronizing in real time) which program listings group information and which display specification will be used at what time.

Local promotion unit 28 has the capability to receive promotional materials locally and to overlay these materials on top of the current video signal. For example, local promotion unit 28 can receive graphics, text, or videos. Videos may be provided to local promotion unit by laser disk, diskette, video cassette, or any other suitable storage medium or delivery mechanism. The character generator capabilities of local promotion unit 28 may be used to generate characters.

During local video insertion, local promotion unit 28 may vary the relative sizes of the promotional information and program listings regions in synchronization with the local video insert based on information in a local data file (i.e., without processing global video control commands from input 32). If desired, an authorized user at a local cable system may provide local commands to local promotion unit 28 using an input interface (not shown). For example, the user may input a test command or may change a configuration parameter, if permitted to do so by the television program guide service provider.

Figure 3:
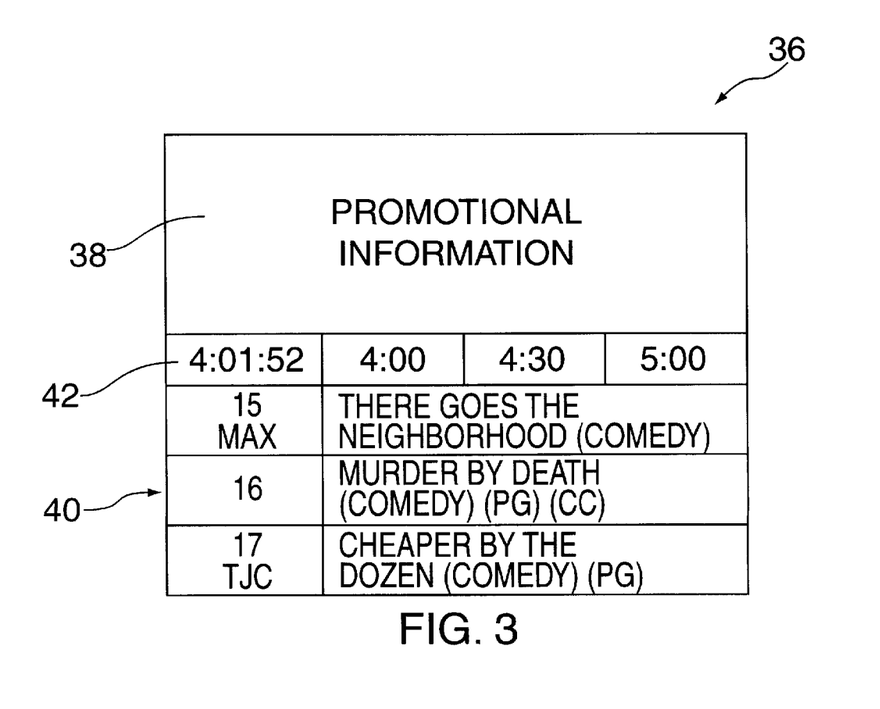
FIGS. 3–10 are views of illustrative display screens in accordance with the present invention.

Television distribution facility 20 provides promotional information (whether from the global video stream or locally inserted material) and program listings to television units 24 on a dedicated television channel. Viewers at television units 24 (FIG. 2) are presented with display screens such as display screen 36 of FIG. 3. As shown in FIG. 3, the display screen 36 contains promotional information region 38 and program listings region 40.

The program listings region 40 preferably has a status bar 42, which contains the current time and the current time slots (rounded off to the nearest half hour). Program listings region 40 preferably contains one grid element per channel. Each grid element may contain one or more lines of text. Program listings region 40 preferably has 2–4 separate time slots of program listings (i.e., enough for 1–2 hours of programming). Program listings in region 40 are preferably provided as a scrolling list, but may be provided in the form of a series of successively displayed pages of program listings, if desired. If local promotion unit 28 provides program listings in the form of successive pages, the transitions between pages may be instantaneous or may involve the use of a fade in and fade out between pages. Promotional information region 38 may contain text, graphics, or video.

In particular, the program listings region 40 of FIG. 3 shows program listings corresponding to several television programs located on contiguous channels (i.e., channels 15, 16, and 17), organized according to program listings group information (i.e., all are related to comedy).

Figure 4:
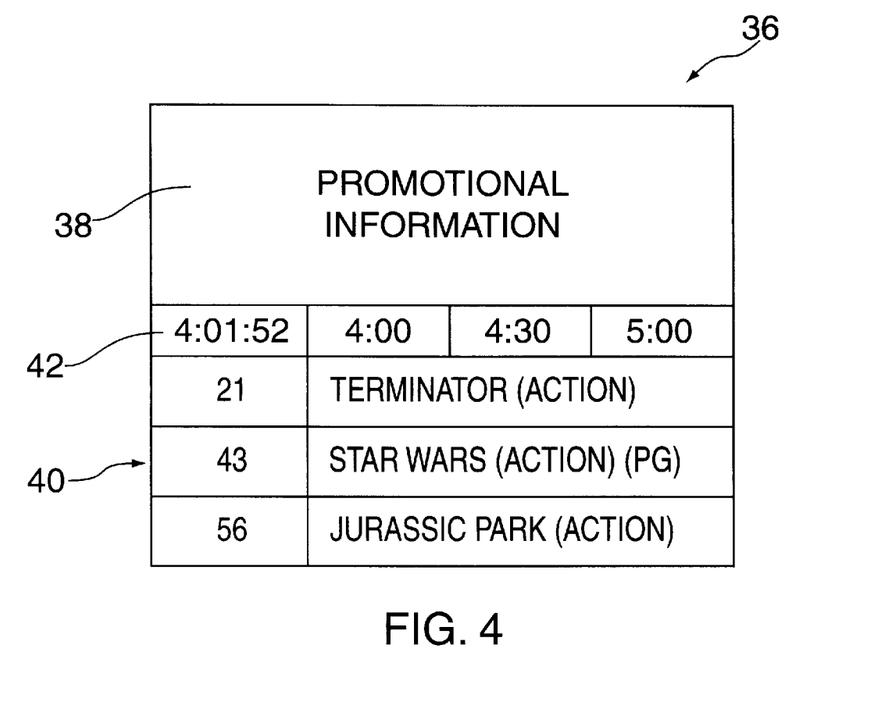
Figure 5:
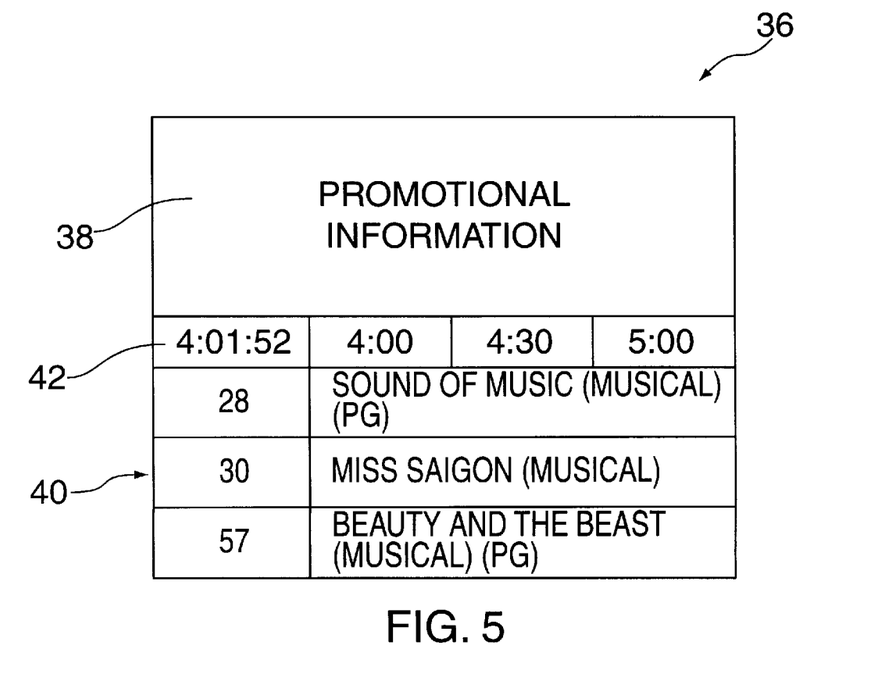

The program listings region 40 of FIG. 4 shows program listings corresponding to several television programs located on non-contiguous channels (i.e, channels 21, 43, and 56), organized according to program listings group information (i.e., all related to action). FIG. 5 is another example of program listings corresponding to a non-continguous channel group (i.e., channels 28, 30, and 57), organized according to program listings group information (i.e., all related to musicals).

Figure 6:
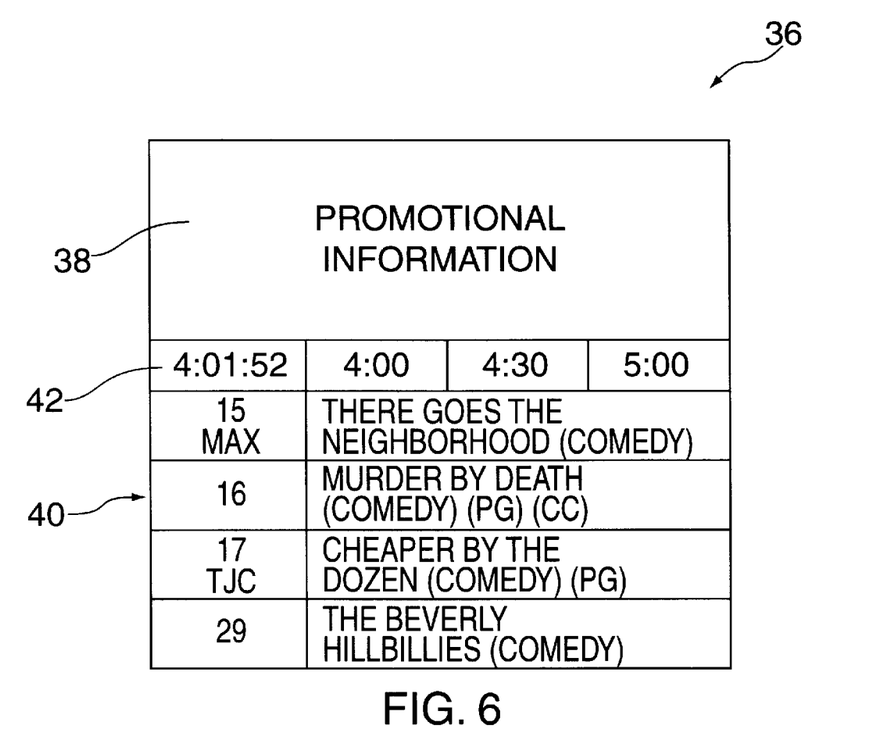

FIG. 6 shows a reduced area for promotional information and increased area for program listings.

Figure 7:
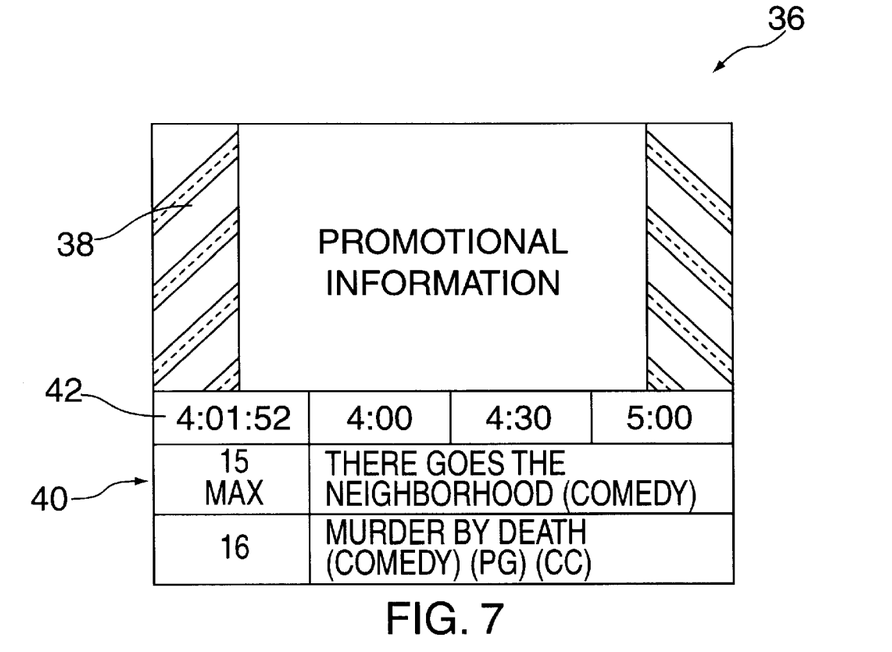

FIG. 7 shows and increased area for promotional information and reduced area for program listings. In addition, FIG. 7 shows an example of how the graphic attributes of the display screen are determined by the display specification. In this instance, the graphics provided along the side margins of the promotional information region 38 correspond to the New Year's season.

Figure 8:
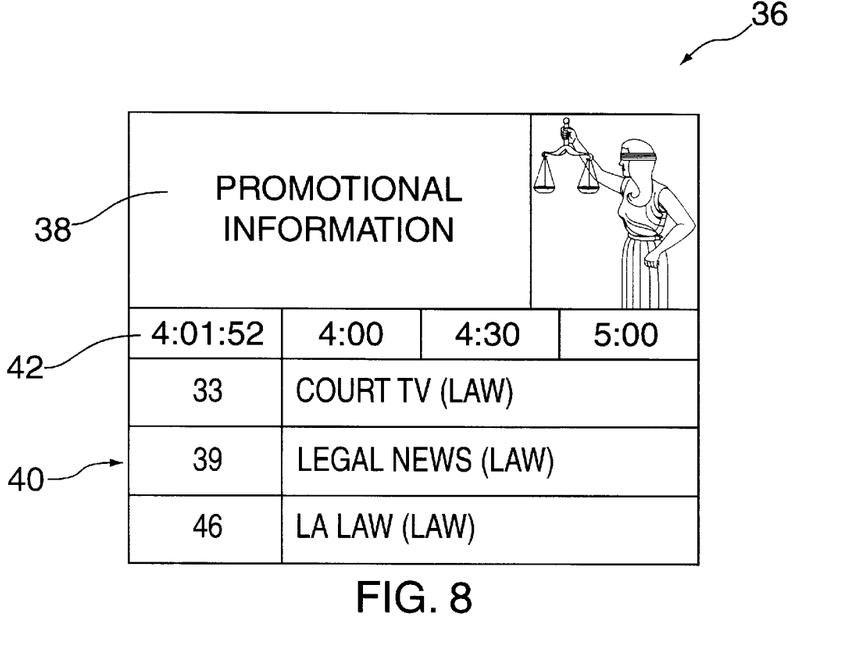

FIG. 8 shows an example of how the graphic attributes of the display screen are determined by the display specification. In particular, a computer graphic (or video image) representing a woman holding a sword and the scales of justice is displayed in the right portion of the promotional information region 38. This corresponds to the program listings displayed. Here, a non-continguous channel group (i.e., channels 33, 39, and 36), organized according to program listings group information (i.e., all related to law) are displayed.

Figure 9:
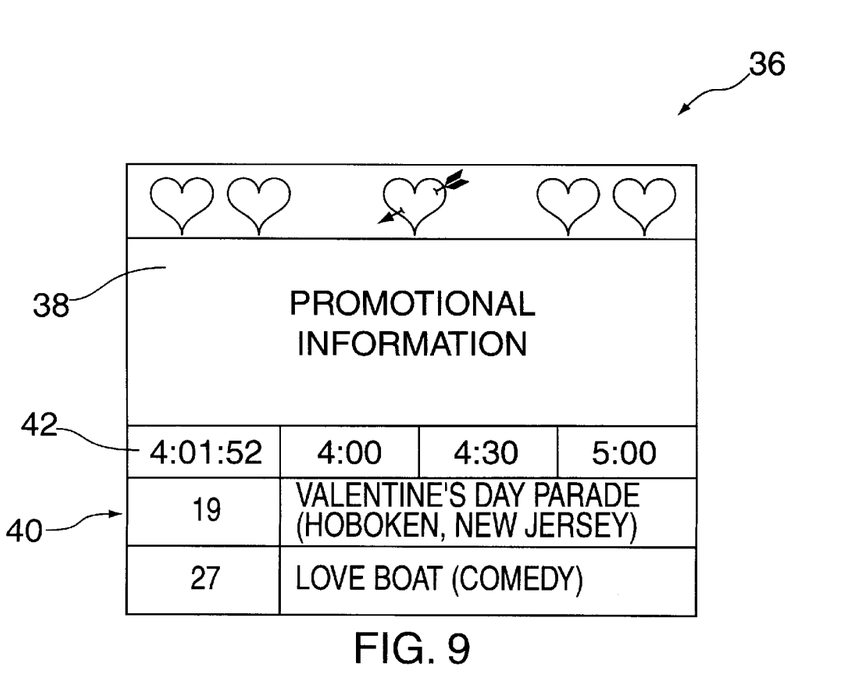

FIG. 9 shows another example of how the graphic attributes of the display screen may be determined by the display specification. In particular, computer graphics (or video images) representing hearts are displayed in the upper portion of the promotional information region 38. This corresponds to the time of year (in this case Valentine's Day). Here, a non-continguous channel group (i.e., channels 19 and 27) are displayed. Channel 19 includes a program listing for a non-television program (i.e., the Valentine's Day Parade in Hoboken, N.J.).

Figure 10:
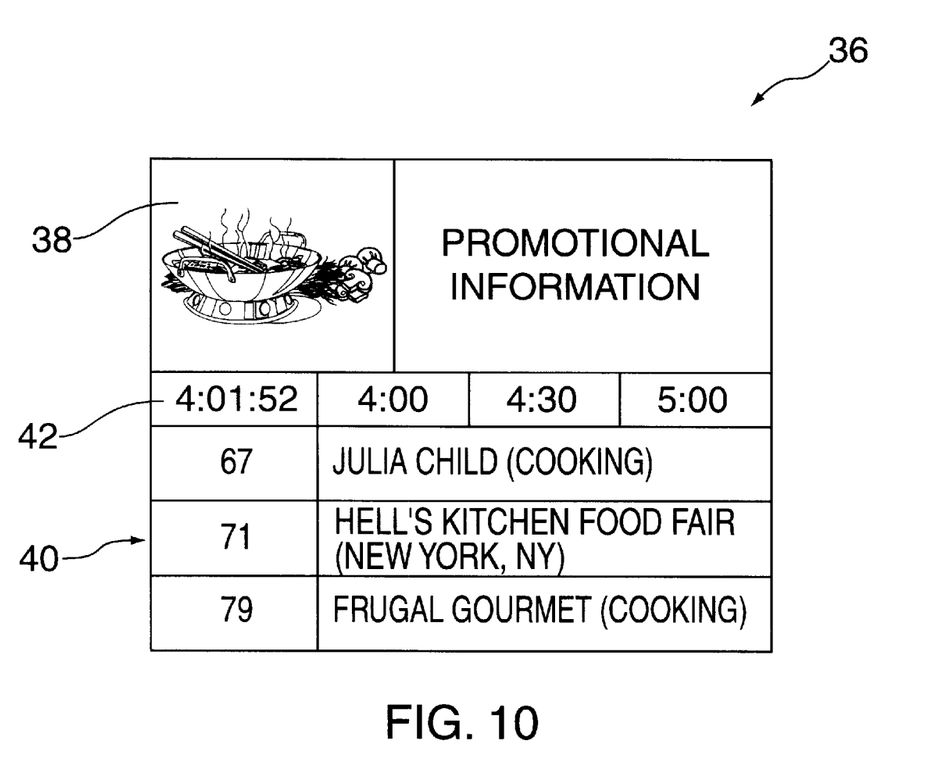

FIG. 10 shows another example of how the graphic attributes of the display screen may be determined by the display specification. In particular, computer graphics (or video images) representing a boiling pot is displayed in the upper portion of the promotional information region 38. This corresponds to the program listings group information (in this case "cooking"). Here, a non-continguous channel group (i.e., channels 67, 71, and 79) are displayed. Channel 71 includes a program listing for a non-television program (i.e., the Hell's Kitchen Food Fair in New York, N.Y.).

Figure 11:
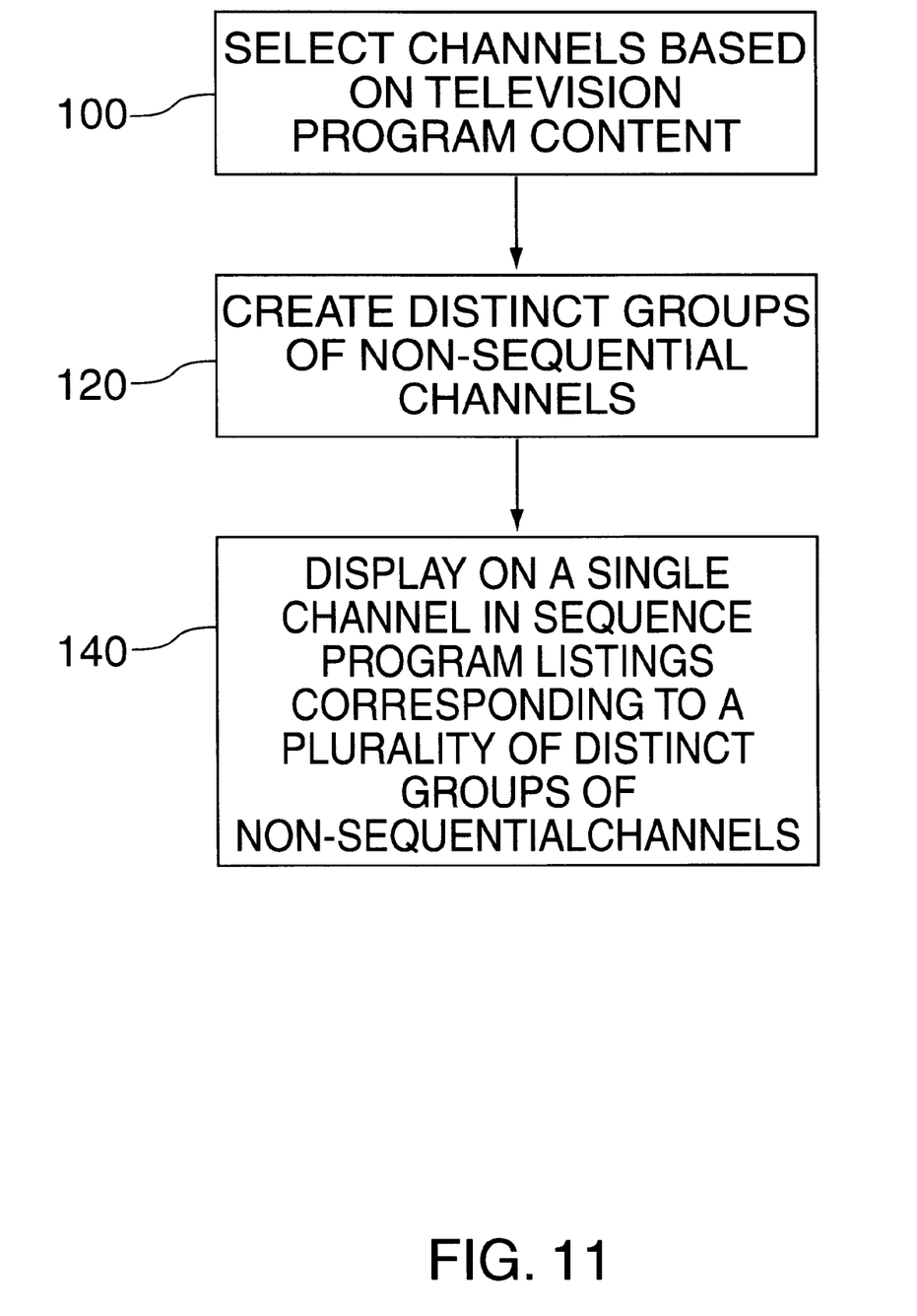
FIGS. 11 and 12 are flow charts of steps involved in presenting program listings information to a user in accordance with the present invention.
Figure 12:
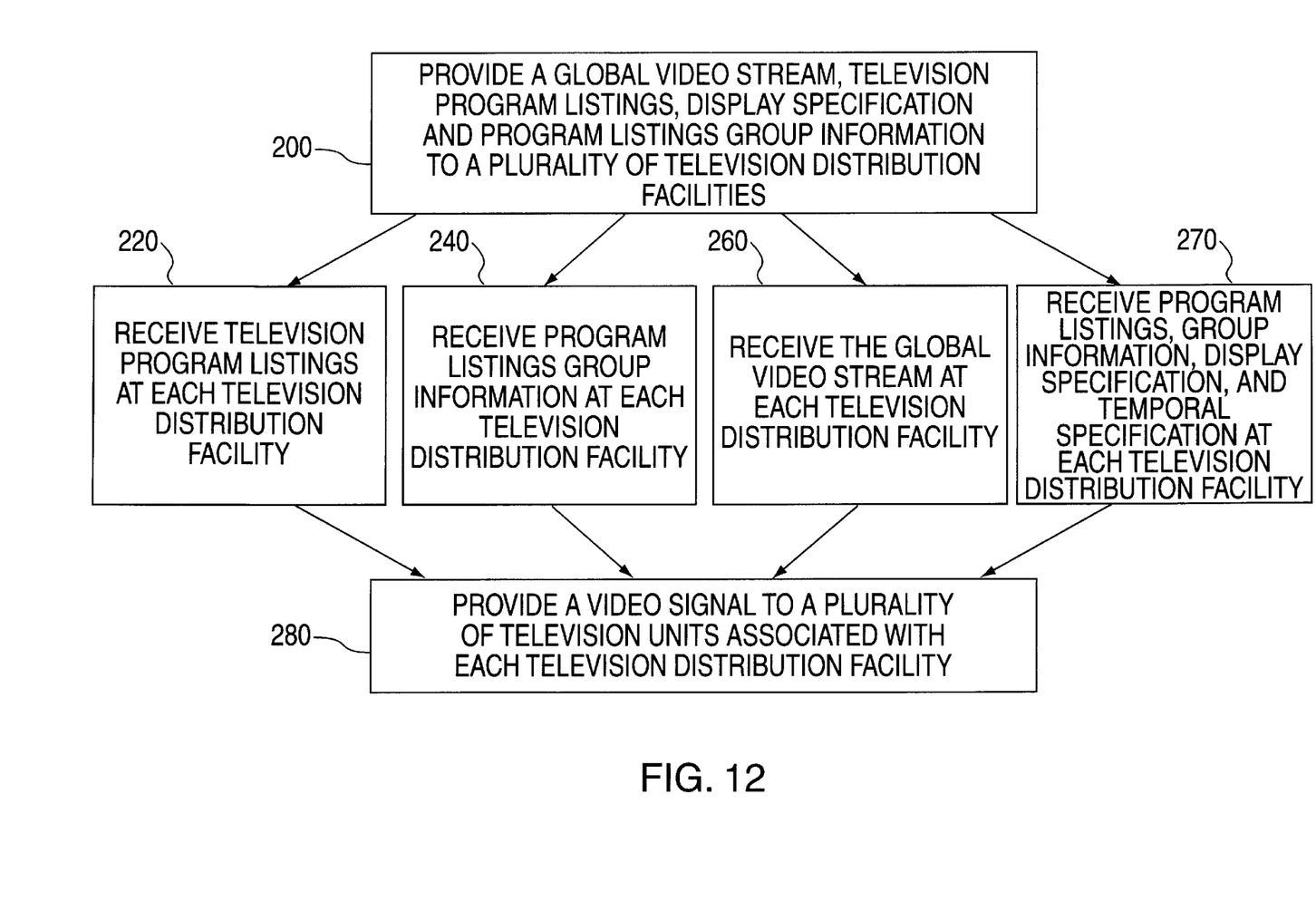

FIGS. 11 and 12 are flow charts of steps involved in presenting program listings information to a user in accordance with the present invention. In particular, FIG. 11 shows steps included in a method for use with a television distribution facility for providing program listings information to user television equipment. Channels are selected based on television content in step 100. Distinct groups of channels are created in step 120. Program listings corresponding to a plurality of distinct groups of channels are transmitted in sequence in a single channel in step 140.

As shown in FIG. 12, a global video stream, program listings, program listings group information, and display specification are provided to a plurality of television distribution facilities in step 200. The global video stream, program listings, program listings group information, and display specification are received at each television distribution facility in steps 220, 240, 260, and 270, respectively. A video signal is provided to a plurality of television units associated with each television distribution facility in step 280.

The foregoing is merely illustrative of the principles of this invention and various modifications can be made by those skilled in the art without departing from the scope and spirit of the invention.

What is claimed is:

1. A system for providing promotional information and program listings on a given channel to viewer television units, each television unit having a display screen, comprising:

a main facility for providing at least one global stream of promotional videos, program listings, and program listings group information, wherein the program listings group information serves as a template for determining groupings of channels;

a plurality of television distribution facilities, each connected to a plurality of associated television units, each television distribution facility receiving the at least one global stream of promotional videos, program listings, and program listings group information from the main facility, and providing a video signal over the given channel wherein the promotional information is displayed on the display screen and the program listings are displayed in groups on the display screen based on the program listings group information without user intervention.

2. The system defined in claim 1 wherein:

each of the plurality of television distribution facilities further receives a display specification for determining the graphic attributes of the display screen of each television unit.

3. The system defined in claim 2 wherein:

each of the plurality of television distribution facilities further receives a temporal specification for synchronizing the program listings group information and the display specification.

4. The system defined in claim 1 wherein:

the global video stream contains video advertisements, each television distribution facility providing the video advertisements to each associated television unit for display in the promotional information region.

5. The system defined in claim 1 wherein:

local promotional information is provided to each television distribution facility, each television distribution facility providing the local promotional information to each associated television unit for display in the promotional information region.

6. The system defined in claim 5 wherein:

the local promotional information is a local video advertisement.

7. The system defined in claim 5 wherein:

the local promotional information is a logo.

8. The system defined in claim 1 wherein:

the program listings region contains scrolling program listings.

9. A method for providing promotional information and program listings on a given channel to viewer television units, each television unit having a display screen, the method comprising:

providing at least one global stream of promotional videos, program listings, and program listings group information that serves as a template for determining groupings of channels, from a main facility to a plurality of television distribution facilities, each television distribution facility being connected to a plurality of associated television units;

receiving the at least one global stream of promotional videos, program listings, and program listings group information from the main facility at each television distribution facility; and providing a video signal over the given channel wherein the promotional information is displayed on the display screen and the program listings are displayed in groups on the display screen based on the program listings group information without user intervention.

10. The method defined in claim 9 further comprising:

receiving at each television distribution facility a display specification for determining the graphic attributes of the display screen of each television unit.

11. The method defined in claim 9 further comprising:

receiving at each television distribution facility a temporal specification for synchronizing the program listings group information and the display specification.

12. The method defined in claim 9 further comprising:

providing the promotional videos from the global video stream to each associated television unit for display in the promotional information region.

13. The method defined in claim 9 further comprising:

providing local promotional information to each television distribution facility, each television distribution facility providing the local promotional information to each associated television unit for display in the promotional information region.

14. The method defined in claim 13 wherein:

the local promotional information is a local video advertisement.

15. The method defined in claim 13 wherein:

the local promotional information is a logo.

16. The method defined in claim 9 further comprising:

scrolling the program listings in the program listings region.

17. A system for providing promotional information and program listings on a given channel to viewer television units, each television unit having a display screen, comprising:

a main facility for providing at least one global stream of promotional videos, program listings, program listings group information that serves as a template for determining groupings of channels, and a display specification;

a plurality of television distribution facilities, each connected to a plurality of associated television units, each television distribution facility receiving the at least one global stream of promotional videos, program listings, program listings group information that serves as a template for determining groupings of channels, and display specification from the main facility, and providing a video signal over the given channel wherein:

the program listings are displayed in groups on the display screen based on the program listings group information without user intervention and the graphic attributes of the display screen are determined by the display specification and correspond to the groups of program listings.

18. A method for providing promotional information and program listings on a given channel to viewer television units, each television unit having a display screen, the method comprising:

providing at least one global stream of promotional videos, program listings, program listings group information that serves as a template for determining groupings of channels, and a display specification from a main facility to a plurality of television distribution facilities, each television distribution facility being connected to a plurality of associated television units;

receiving the at least one global stream of promotional videos, program listings, program listings group information and display specification from the main facility at each television distribution facility; and providing a video signal over the given channel wherein:

the program listings are displayed in groups on the display screen based on the program listings group information without user intervention; and the graphic attributes of the display screen are determined by the display specification and correspond to the groups of program listings.

19. The method of claim 18 further comprising:

coordinating the display specification with selected ones of:
colors,
graphic icons, and
video images.

* * * * *